2 Sheets—Sheet 1.

N. WALKLY.
ELECTROMAGNETIC ENGINE.

No. 809.  Patented June 27, 1838.

2 Sheets—Sheet 2.

N. WALKLY.
ELECTROMAGNETIC ENGINE.

No. 809. Patented June 27, 1838.

UNITED STATES PATENT OFFICE.

NELSON WALKLY, OF TUSCALOOSA, ALABAMA.

IMPROVED MODE OF CHANGING THE POLES OF ELECTRO-MAGNETS.

Specification forming part of Letters Patent No. 809, dated June 27, 1838.

*To all whom it may concern:*

Be it known that I, NELSON WALKLY, a native of Southington, Connecticut, but residing in Tuscaloosa, Alabama, have made a discovery of a mode of changing the polarity of electro-magnets in such a manner as to produce rotary motion, which can be applied as a moving power for propelling machinery, which is described as follows, reference being had to the annexed drawings.

Figure 1:
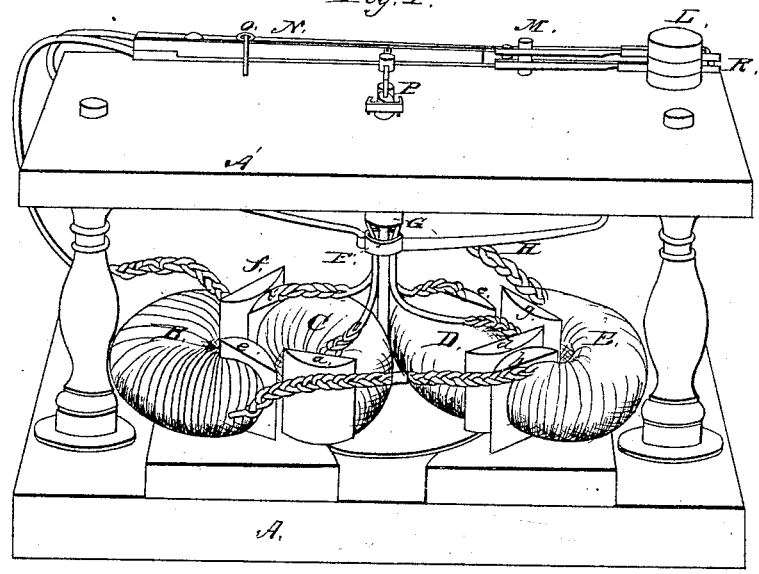

The frame A A', Figure 1, may be made of any substantial material, square or any other form, divided into two or more platforms, A A', upon which the parts of the work are fixed, which may be made of such size and strength as may be required.

Figure 2:
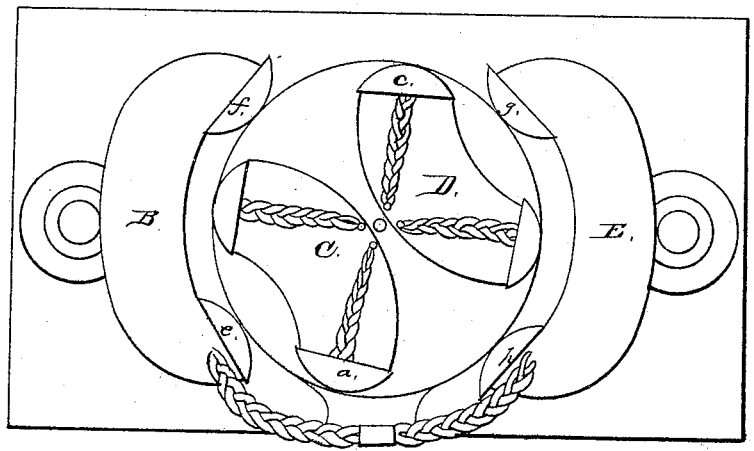

The electro-magnets B C D E, Figs. 1 and 2, may be made semicircular, as in the drawings. Two of them, C D, are fixed to a horizontal wheel, which revolves on a pivot on a vertical shaft, the point resting on the lower platform.

The magnets may be made of any number, according to the power desired, and made by first insulating a bar of soft iron by varnishing it and wrapping it with silk or paper, and winding it with copper wire wound and varnished, so as to prevent the different layers from coming in contact with each other.

The ends of the wires on the revolving magnets are connected with two cylinders, F G, placed on the shaft; but these cylinders are prevented from touching it by wood being placed between the bands and the shaft, of sufficient thickness to permit conductors to pass between the bands and the shaft without coming in contact with either.

Figure 4:
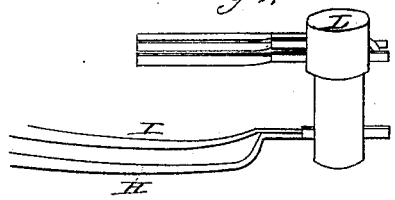

The cylinders are represented by F G, placed one above the other on the shaft. The wire from the end of the magnet marked $d$ is attached to the cylinder F, and the end of the same magnet, marked $c$, passes its conductor through the cylinder F, and is attached to the upper band, G, and in the same way with the other magnet $c$ the wire from the end 1 is attached to the upper band, and from the end $b$ to the lower one. Resting against these cylinders are two conductors, H I, Fig. 4, leading to the negative and the positive side of a galvanic battery, the positive wire passing to the cylinder G, and thence to the ends of the magnets marked $a$ and $c$, and through, via the ends $b$ and $d$, to the cylinder F, and from thence by the conductor H to the negative side of the battery, making the ends of the revolving magnets $a$ and $c$ north poles, and the ends $d$ and $b$ south poles.

Figure 3:
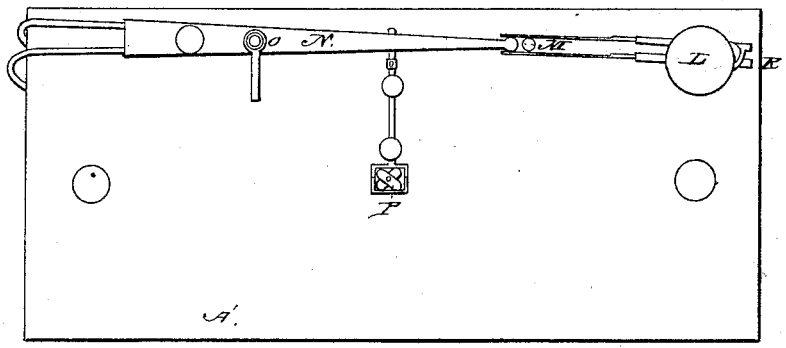

Through the post L, fixed in the upper platform, are fixed four conductors connected with the battery. The upper ones of these conductors has its outer end bent over and soldered to the opposite lower ones. These lower ones, one of them is connected with the positive side of the battery, and the other with the negative. These four conductors, when at rest, are resting against a glass pin, M. Between the ends of these spring-conductors is interposed a lever, N, the end of which is just the size of the pin M. This lever is composed of two plates of metal with a piece of wood or other non-conducting substance between them, which may be seen in Fig. 1, and vibrates on the glass pivot $o$, fixed in the upper platform, Figs. 1 and 3, and is made to vibrate by means of the double elliptic cam fixed on the upper end of the shaft P, the pitman of which is connected with the lever. If more revolving magnets are used than two, the cam may be fixed on a pinion revolving more times than the main shaft, so as to change the polarity every time one of the stationary magnets comes opposite one of the rotary ones. The lever may be moved by a rack and segment, or by any other means.

To magnetize the outer or stationary magnets the current of electricity passes from the positive side of the battery onto the conductor R, and from thence onto the lower plate of the lever, and from thence to the stationary magnet E, to the end $h$, making that a north pole; thence to the opposite end, making $g$ a south pole; thence to $f$, making that a north pole; thence by the wire round the magnet to $e$, making that end a south pole; and thence back to the negative side of the battery, via upper plate, to lever and upper spring-conductor on the side nearest you. When the machine is at rest the lever will be in contact with all the four conducting-springs, and the ends of the rotary magnets opposite the ends of the stationary ones. By moving the wheel the cam will move the end of the lever and the end of the springs toward you away from the pin M, leaving the two opposite springs resting against the pin. The ends $e$ and $d$ being north poles, repel each other, which will bring the end $d$ around to $h$, and the momentum a little past, and will carry the lever back, and will leave the two conducting-springs, the lower one of which is positive, and will move the springs on the opposite side, the upper one of which is positive, and thereby change the polarity of the stationary magnets, making ends $h$ and $f$ south ends, and $e$ and $g$ north poles, which will carry the wheel one-fourth of a revolution farther, when the change will be effected, as before, and thereby continue its motion, which may be conveyed from the shaft to any machinery which may be propelled thereby.

The discovery here claimed, and desired to be secured by Letters Patent, is—

The mode of changing the polarity of stationary electro-magnets in the manner above described, or any other in principle substantially the same, by means of which a rotary motion is produced which may be applied to machinery as a moving principle.

NELSON WALKLY.

Witnesses:
BARENT DUBOIS,
GEO. RIX.